UNITED STATES PATENT OFFICE.

FRANCIS X. GOVERS, OF OWEGO, NEW YORK, ASSIGNOR TO AMERICUS MANUFACTURING COMPANY, OF NEW YORK, N. Y., A CORPORATION OF NEW YORK.

INSOLUBLE FABRIC-COATING AND METHOD OF MAKING SAME.

No. 800,146.      Specification of Letters Patent.      Patented Sept. 26, 1905.

Application filed November 12, 1904. Serial No. 232,518.

*To all whom it may concern:*

Be it known that I, FRANCIS X. GOVERS, a citizen of the United States, residing at Owego, in the county of Tioga and State of New York, have invented new and useful Improvements in Insoluble Fabric-Coatings and Methods of Making the Same, of which the following is a specification.

This invention relates to fabric coating and sizing, and has for its principal object to produce an improved waterproof casein coating for paper and the like in which sulfuric-acid casein is utilized in a manner heretofore unknown, and it has for its further object to provide a casein coating which may contain as an ingredient thereof formaldehyde in any desired quantity without precipitation of the casein therein.

In alkaline solutions of casein, except where ammonia is used as the solvent, precipitation of the casein is produced by the addition of a very limited amount of formaldehyde, thereby rendering it impossible to obtain in such solution sufficient formaldehyde to produce a satisfactory waterproof coating. Attempts to overcome this precipitation by the addition of large amounts of alkali have been found to result in the production of a coating which is liable to foam and spot and have a mottled appearance. The use of ammonia as a solvent for casein is open to the objection that the odor of the solution is highly obnoxious to the men handling it, it being in some cases almost impossible to use it.

I have found that formaldehyde may be added in almost unlimited amounts to a solution of sulfuric acid or other casein in a solvent containing sodium phosphate and sodium hyposulfite without causing precipitation of the casein.

In the practice of my invention I dissolve casein, preferably sulfuric-acid casein, in a solution containing sodium phosphate and sodium hyposulfite. To this I add any desired amount of a suitable base or filler, preferably china-clay, and I sometimes employ therewith blancfixe or satin white and a small proportion of wax, preferably a wholly or partially saponified vegetable wax. To the casein solution with the base or filler, wax, &c., above set forth, I add a small percentage of formaldehyde, either by passing the gas through the casein solution or by using the forty-per-cent. formaldehyde solution known as "formalin." The addition of the formaldehyde may take place prior to the application of the casein solution to the paper or subsequent thereto. In the latter case it is preferable to employ the forty-per-cent. solution of formaldehyde referred to, and to immerse the coated fabric therein immediately after the application of the coating.

The proportions of the ingredients of my improved composition may be varied in accordance with the paper or other fabric to be coated therewith. The following proportions, by weight, have been found to produce a coating of particular excellence: casein, fifty parts; trisodium phosphate, ten parts; sodium hyposulfite, five parts; china-clay, two hundred parts; satin white, fifty parts; wax, five parts; water, one hundred and fifty parts; formaldehyde, 1.5 parts.

The employment of a solution of sodium phosphate and sodium hyposulfite permits of the use in my composition of any required proportion of formaldehyde to make the coating as waterproof as desired. The casein, even when I employ sulfuric-acid casein, dissolved in the solution of sodium phosphate and sodium hyposulfite is not precipitated from such solution by blancfixe, satin white, or equivalent material.

The casein solution above described has a slight acid reaction and for this reason does not attack the coating-brushes as strongly-alkaline casein solutions are known to do. It flows readily and smoothly under the coating-brushes, flowing together well after coating and leaving a surface wholly free from brush-marks. The alkaline hyposulfite which I employ, being deliquescent, absorbs a certain amount of moisture, which renders the paper or the like coated with my improved composition soft and capable of being bent as sharp angles in box manufacture without exhibiting any sign of breaking. The alkaline hyposulfite by reason of its preservative action on organic matter prevents the decomposition of the casein, thus avoiding the highly-offensive odor and partial precipitation and foam incident to the decomposition of casein, which are known to give a spotted or mottled appearance to the coating.

While the alkaline hyposulfite which I prefer to employ is that also known as the "thiosulfate," the true hyposulfite may also be used.

An important and valuable feature of my invention is that my improved coating has no effect whatever upon lithographic stones, so that papers coated with the composition herein described are perfectly adapted to be printed by the lithographic process.

My improved composition is used in the manner well known in this art and produces a coating having the qualities and advantages hereinbefore mentioned.

My composition can be utilized in other relations than as a fabric-coating, and any use to which such composition is found applicable is contemplated as being within the protection for which this application is made.

It is to be understood that this invention is not limited to the exact proportions specified nor to the employment of all the ingredients together nor to the use only of the ingredients mentioned, inasmuch as the employment of equivalents of the ingredients hereinbefore specifically referred to are within the scope of this invention as defined in the appended claims.

Having thus described my invention, what I claim as novel, and desire to secure by Letters Patent, is—

1. The process of producing waterproof coating for paper and the like consisting in dissolving casein in a solvent having an acid reaction and adding formaldehyde thereto.

2. The process of producing a waterproof coating for paper and the like consisting in dissolving casein in a solvent having an acid reaction and containing an alkaline hyposulfite.

3. The process of producing a waterproof coating for paper and the like consisting in dissolving casein in a solvent having an acid reaction which will hold it in solution upon the addition thereto of a material amount of an alkaline earth sulfate, and adding formaldehyde.

4. The process of producing a waterproof coating for paper and the like which consists in dissolving casein in a solution containing an alkaline phosphate and an alkaline hyposulfite and adding formaldehyde thereto.

5. The process of producing a coating for paper and the like which consists in dissolving casein in a solution containing sodium phosphate and sodium hyposulfite and adding thereto a filler and formaldehyde.

6. The process of producing a coating for paper and the like which consists in dissolving casein in a solution containing an alkaline phosphate and an alkaline hyposulfite, adding a filler thereto, spreading the composition thus prepared out in the form of a thin film and rendering the same waterproof by the action of formaldehyde.

7. A waterproof coating for paper and the like containing sulfuric-acid casein, an alkaline hyposulfite a filler and formaldehyde.

8. A waterproof coating for paper and the like containing casein, an alkaline hyposulfite, an alkaline phosphate, a filler and formaldehyde.

9. A waterproof coating for paper and the like containing casein, sodium phosphate, sodium hyposulfite, a filler and formaldehyde.

10. A waterproof coating for paper and the like containing an alkaline phosphate, an alkaline hyposulfite a filler, wax and formaldehyde.

11. The herein-described waterproof coating for paper and the like containing casein dissolved in a solution containing sodium phosphate and sodium hyposulfite and having china-clay, satin white, and formaldehyde added thereto.

In testimony whereof I affix my signature in presence of two subscribing witnesses.

FRANCIS X. GOVERS.

Witnesses:
KATHRYN LA MONTE,
ALFRED PFISTER.